US009213665B2

(12) United States Patent
Moyer et al.

(10) Patent No.: US 9,213,665 B2
(45) Date of Patent: Dec. 15, 2015

(54) DATA PROCESSOR FOR PROCESSING A DECORATED STORAGE NOTIFY

(75) Inventors: William C. Moyer, Dripping Springs, TX (US); Michael D. Snyder, Cedar Park, TX (US); Gary L. Whisenhunt, Leander, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 923 days.

(21) Appl. No.: 12/259,368

(22) Filed: Oct. 28, 2008

(65) Prior Publication Data

US 2010/0106872 A1  Apr. 29, 2010

(51) Int. Cl.
| | | |
|---|---|---|
| *G06F 12/02* | (2006.01) | |
| *G06F 13/42* | (2006.01) | |
| *G06F 13/16* | (2006.01) | |
| *G06F 9/30* | (2006.01) | |
| *G06F 9/38* | (2006.01) | |

(52) U.S. Cl.
CPC .......... *G06F 13/4217* (2013.01); *G06F 9/3004* (2013.01); *G06F 9/30043* (2013.01); *G06F 9/3834* (2013.01); *G06F 9/3885* (2013.01); *G06F 13/16* (2013.01); *G06F 2213/0054* (2013.01)

(58) Field of Classification Search
CPC ...... G06F 2213/0054; G06F 9/3004–9/30047; G06F 13/16–13/1694; G06F 13/42–13/4295
USPC ............... 711/155, 167–169; 710/5–6, 20–21
See application file for complete search history.

(56) References Cited

U.S. PATENT DOCUMENTS

| | | | | |
|---|---|---|---|---|
| 4,016,545 | A | * | 4/1977 | Lipovski ................. 711/100 |
| 4,851,990 | A | | 7/1989 | Johnson |
| 5,191,649 | A | * | 3/1993 | Cadambi et al. ......... 709/225 |
| 5,469,556 | A | | 11/1995 | Clifton |
| 5,699,516 | A | * | 12/1997 | Sapir et al. ............ 710/110 |
| 5,848,293 | A | | 12/1998 | Gentry |
| 6,219,775 | B1 | * | 4/2001 | Wade et al. ............... 712/11 |
| 6,247,064 | B1 | | 6/2001 | Alferness et al. |
| 6,253,273 | B1 | | 6/2001 | Blumenau |
| 6,336,178 | B1 | | 1/2002 | Favor |
| 6,490,642 | B1 | * | 12/2002 | Thekkath et al. ......... 710/110 |
| 6,591,355 | B2 | | 7/2003 | Schuster et al. |

(Continued)

OTHER PUBLICATIONS

PCT/US2009/058928 International Search Report and Written Opinion mailed Apr. 27, 2010.

(Continued)

*Primary Examiner* — Aimee Li
*Assistant Examiner* — Nicholas Simonetti

(57) ABSTRACT

A data processing system having a processor and a target device processes decorated instructions (i.e. an instruction having a decoration value). A device of the data processing system such as the processor sends transactions to the target device over a system interconnect. A decorated storage notify (DSN) transaction includes an indication of an instruction operation, an address associated with the instruction operation, and a decoration value (i.e. a command to the target device to perform a function in addition to a store or a load). The transaction on the system interconnect includes an address phase and no data phase, thereby improving system bandwidth. In one form the target device (e.g. a memory with functionality in addition to storage functionality) performs a read-modify-write operation using information at a storage location of the target device.

22 Claims, 5 Drawing Sheets

EXECUTION OF LOAD 1, DECORATED STORAGE NOTIFY 1, LOAD 2, DECORATED STORAGE NOTIFY 2 •••

(56) References Cited

U.S. PATENT DOCUMENTS

| | | |
|---|---|---|
| 6,829,698 B2 | 12/2004 | Arimilli et al. |
| 2004/0230836 A1 | 11/2004 | Larsen |
| 2004/0243823 A1 | 12/2004 | Moyer et al. |
| 2005/0229089 A1* | 10/2005 | Oza et al. ............. 714/801 |
| 2005/0240745 A1* | 10/2005 | Iyer et al. ............. 711/167 |
| 2005/0257025 A1 | 11/2005 | Spencer |
| 2007/0094475 A1 | 4/2007 | Bridges |
| 2007/0150671 A1 | 6/2007 | Kurland |
| 2007/0180518 A1 | 8/2007 | Moyer |
| 2007/0266206 A1 | 11/2007 | Kim et al. |
| 2008/0229052 A1 | 9/2008 | Ozer et al. |
| 2009/0106533 A1 | 4/2009 | Arakawa |

OTHER PUBLICATIONS

U.S. Appl. No. 12/259,369, Moyer, W.C., et al., "Permissions Checking for Data Processing Instructions", Office Action—Notice of Allowance, mailed Sep. 3, 2013.

U.S. Appl. No. 12/259,369 Office Action mailed May 8, 2013.

* cited by examiner

| DECORATED NOTIFY OPERATION TABLE ||
|---|---|
| DECORATION VALUE | DECORATION OPERATION |
| 000 | DOUBLEWORD INCREMENT |
| 001 | WORD INCREMENT |
| 010 | DOUBLEWORD CLEAR |
| 011 | WORD CLEAR |

*FIG. 6*

DATA PROCESSOR FOR PROCESSING A DECORATED STORAGE NOTIFY

RELATED APPLICATION

This application is related to our copending application entitled "Permissions Checking For Data Processing Instructions", U.S. patent application Ser. No. 12/259,369, filed of even date herewith and assigned to the assignee of record herein.

BACKGROUND

1. Field

This disclosure relates generally to data processing systems, and more specifically, to the control of a target device in a data processing system.

2. Related Art

In a multiple processor or multiple core data processing system that implements a network, multiple counters are used to maintain statistics requiring a variety of functions such as increment, decrement and read-modify-write operations. Because multiple cores may attempt to update the identical counter at the same time, network delays are created and a significant amount of resources are consumed. A single communication link can generate a need for up to a couple hundred million counter updates per second where each update is modifying a prior data value. A mechanism for performing atomic updates, i.e. un-interruptible successive updates, is typically required. Conventional atomic update mechanisms, such as using a software semaphore or a software lock, can cause system delays. To reduce system delays, a statistics accelerator may be used. However, in a single transaction enough information cannot typically be sent to a statistics accelerator to describe an atomic operation. Additionally, atomic updates such as an atomic increment typically require both a data phase, i.e. a transfer of data via a data interconnect, and an address phase, i.e. a transfer of an address via an address interconnect. The transfer of both data and address information for atomic updates results in high bandwidth usage when a significant number of atomic updates are performed.

Because the counter bit sizes can be larger than the size of registers within a processor, a lock variable has also been used to limit access to a counter while multiple storage accesses update sub-sections of the counter. When a core needs to gain ownership of a counter for an atomic update, a significant number of data processing cycles may pass for each lock variable. A processor must use processing cycles to obtain the lock variable, wait for the lock variable to be released if already taken by another processor, perform the counter update and release the lock variable. Thus the system speed and performance is degraded.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 6 illustrates, in table form, an exemplary encoding of instruction operations used by the intelligent memory of FIG. 3.

DETAILED DESCRIPTION

Figure 1:
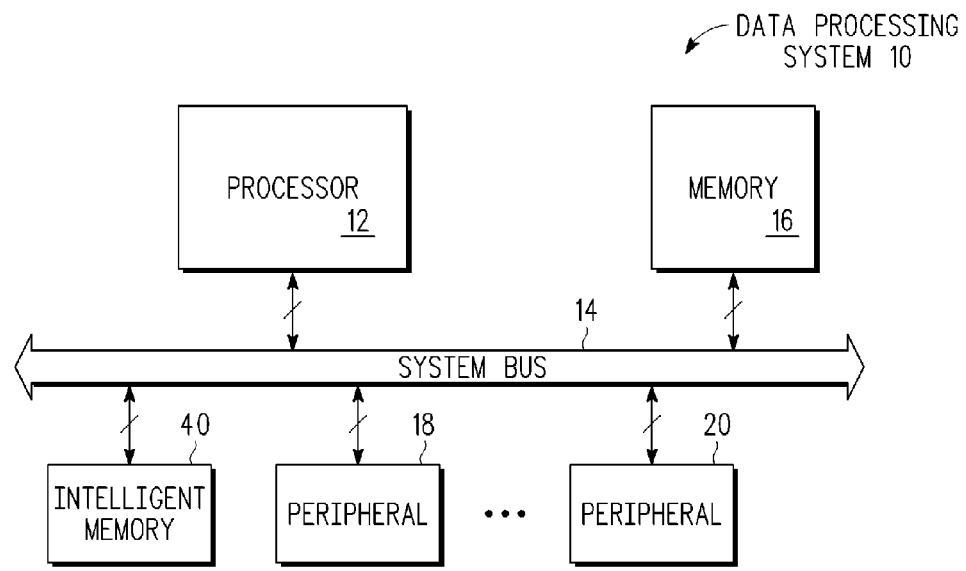
FIG. 1 illustrates in block diagram form a data processing system in accordance with one embodiment of the present invention.

There is herein described a method for operating a data processing system that has a processor and a memory device which is a target or recipient of information from the processor. The processor and memory device are coupled for operating via a system interconnect. The processor executes or processes an instruction. As part of the instruction execution the processor determines an instruction operation associated with the instruction and an address. A decoration value is determined by the processor that is based on the instruction. A decoration value or decoration is information that is supplied to the memory device for performing decorated storage operations. The decoration value is provided from storage in a general purpose register of the processor and is transmitted to the memory device along with a translated address which indicates a target location resulting from the instruction execution in a transaction including an address phase and no data phase. The decoration value is a command to the memory device to perform a function in addition to a primary function of the executed instruction. For example, the executed instruction may be a load or a store of data from or to a target memory location, and the decoration value may be a command to increment the target location or to multiply the target location data by another operand. It should be understood that any of various additional or alternate processing functions may be implemented by the target device in response to the decoration value. The decoration value is not generally interpreted by the processor, and a given decoration value may perform different operations requiring different access permissions depending on the target location of the instruction. As will be described below, not all load and store instructions provide decoration values. In one embodiment, separate load, store, load with decoration, and store with decoration instruction types are provided.

As used herein, the term "bus" is a system interconnect and is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

FIG. 1 illustrates, in block diagram form, a data processing system 10 in accordance with one embodiment of the present invention. Data processing system 10 includes a processor 12, a system bus or system interconnect 14, a memory 16 and a plurality of peripherals such as a peripheral 18, a peripheral 20, an intelligent memory 40 and, in some embodiments, additional peripherals as indicated by the dots in FIG. 1 separating peripheral 18 from peripheral 20. An intelligent memory 40 is coupled to the system interconnect 14 by bidirectional multiple conductors. The memory 16 is a system memory that is coupled to the system interconnect 14 by a bidirectional conductor that, in one form, has multiple conductors. The intelligent memory 40 is a target device of the processor 12 for certain instruction execution as will be explained below. In the illustrated form each of peripherals 18 and 20 is coupled to the system interconnect 14 by bidirectional multiple conductors as is the processor 12. Note that memory 16 can be any type of memory, and peripherals 18 and 20 can each be any type of peripheral or device. In one embodiment, all of data processing system 10 is on a single integrated circuit. Alternatively, data processing system 10 can be implemented using more than one integrated circuit. In one embodiment, at least all of processor 12 is on a single integrated circuit. In another form the system interconnect 14 represents a wireline interconnect and the processor 12 may be physically remote from the target device such as intelligent memory 40. In an alternate embodiment, multiple intelligent modules, such as intelligent memory 40 may be present.

In operation, the processor 12 functions to implement a variety of data processing functions by executing a plurality of data processing instructions. Information needed by processor 12 that is not within the processor 12 is stored in memory 16 or intelligent memory 40. In one embodiment, memory 16 and intelligent memory 40 are referred to as external memories. Intelligent memory 40 is a memory that includes additional circuitry for performing computations as well as implementing the conventional data storage function that a memory conventionally performs. The computations that intelligent memory 40 performs in response to a memory location access are implementation-specific and may vary in various embodiments. In one form the computations are performed in an atomic fashion meaning that the computations are un-interruptible and are completed prior to allowing a subsequent access request to the memory location being modified by the computation. Examples of atomic computations include, but are not limited to, atomic increment or atomic decrement.

Figure 2:
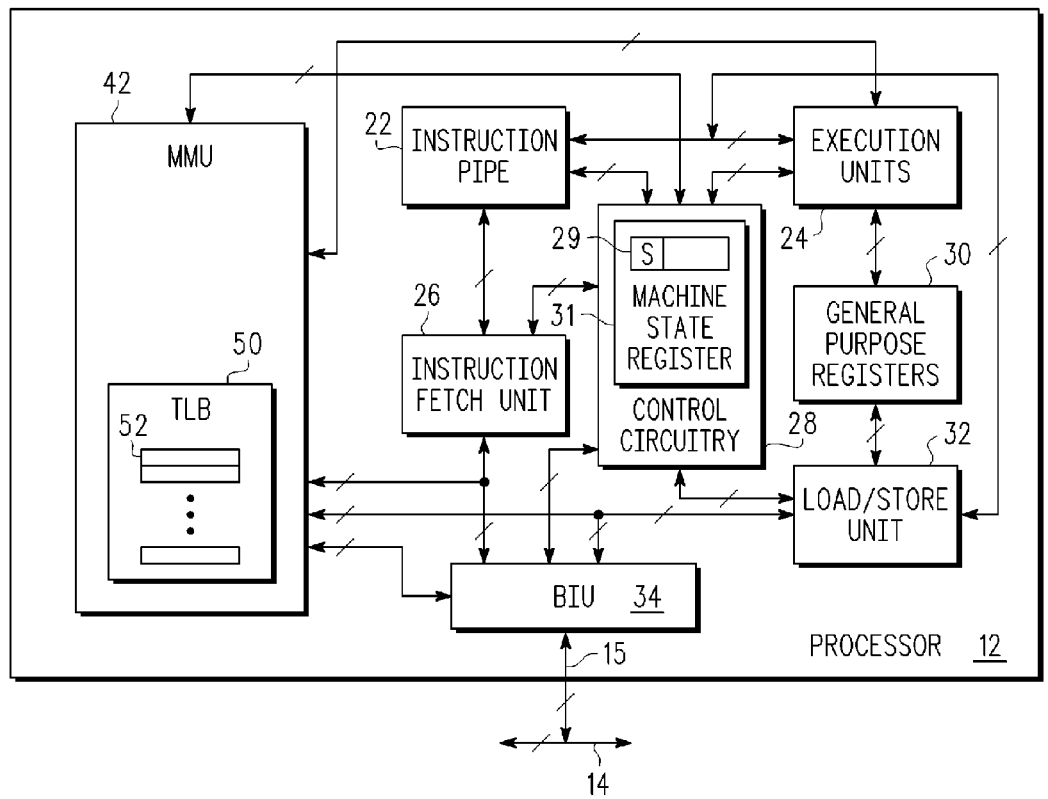
FIG. 2 illustrates in block diagram form an exemplary processor of the data processing system of FIG. 1 in accordance with one embodiment of the present invention.

FIG. 2 illustrates in block diagram form an exemplary architecture of processor 12. The system interconnect 14 is coupled to a bus interface unit (BIU) 34 via a bidirectional multiple bit conductor for communicating signals 15. The bus interface unit 34 is coupled to a memory management unit (MMU) 42 via a bidirectional multiple bit conductor. Within the memory management unit 42 is a translation look-aside buffer (TLB) 50 having a plurality of entries such as TLB entry 52. The bus interface unit 34 is also coupled to both an instruction fetch unit 26 and to the memory management unit (MMU) 42 via a bidirectional multiple bit conductor. The instruction fetch unit 26 is coupled to an instruction pipeline (pipe) 22 via a bidirectional multiple bit conductor. The instruction pipeline 22 is coupled to a plurality of execution units 24 via a bidirectional multiple bit conductor, and the instruction pipeline 22 is coupled to control circuitry 28 via a bidirectional multiple bit conductor. The instruction fetch unit 26 is coupled to the control circuitry 28 via a bidirectional multiple bit conductor. The memory management unit 42 is coupled to the control circuitry 28 via a bidirectional multiple bit conductor. The control circuitry 28 is coupled to the execution units 24 via a bidirectional multiple bit conductor. The bus interface unit 34 is coupled to the control circuitry 28 via a bidirectional multiple bit conductor. The memory management unit 42 is coupled to the execution units 24 via a bidirectional multiple bit conductor. The control circuitry 28 includes a machine state register 31. Within the machine state register 31 is a register having a supervisor bit 29 designated as "S". The logic state of the supervisor bit 29 determines whether the processor 12 is in a supervisor mode or a user mode. The execution units 24 are coupled to the general purpose registers 30 via a bidirectional multiple bit conductor. The general purpose registers 30 are coupled to a load/store unit 32 via a bidirectional multiple-bit conductor. The load/store unit 32 is respectively coupled to the control circuitry 28, the memory management unit 42 and bus interface unit 34, and the instruction pipeline 22 and execution units 24 via bidirectional multiple bit conductors.

Figures 3, 4:
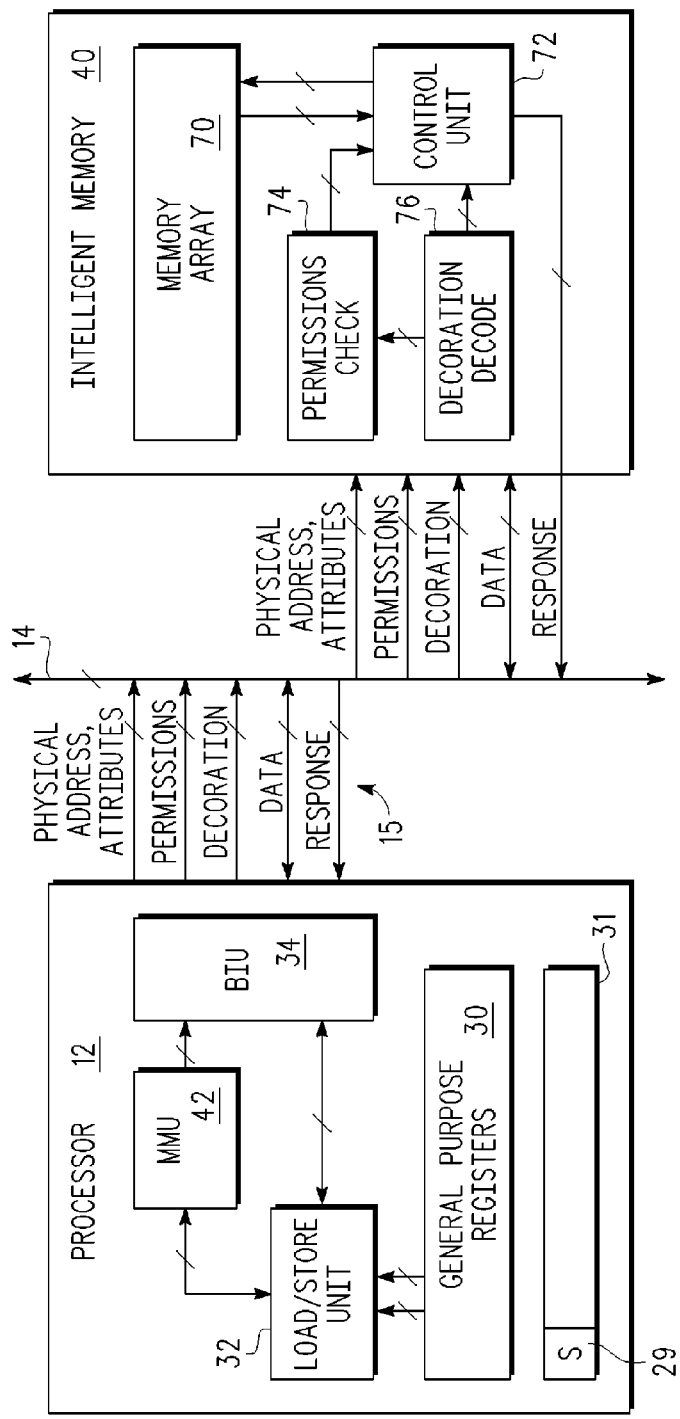
FIG. 3 illustrates in block diagram form, a portion of the data processing system of FIG. 1 illustrating the processor and an intelligent memory in accordance with one embodiment of the present invention.
FIG. 4 illustrates, in diagrammatic form, a data processing instruction for implementing a decorated storage notify in accordance with one embodiment of the present invention.

In operation, an instruction is received by the processor 12 via the system interconnect 14 and bus interface unit 34. The instruction is fetched from the bus interface unit 34 by the instruction fetch unit 26 and coupled to the instruction pipeline 22. The instruction pipeline 22 decodes the instruction and controls the control circuitry 28 and the execution units 24 to execute the instruction. An example of the format of a load/store instruction is illustrated in FIG. 4 wherein a decorated storage notify data processing instruction 300 has various fields. A field 302 holds an instruction operation code (opcodes) which identifies what type of operation is associated with the instruction. Fields 304 and 306 are register fields for respectively holding register designators RA and RB which are registers within the general purpose registers 30. For a certain type of load/store instruction (a decorated storage notify) register A, RA, holds a decoration value having a meaning and purpose that will be explained below. Register B contains a virtual address value. The virtual address is coupled by the load/store unit 32 to the translation look-aside buffer (TLB) 50 of the memory management unit 42 for translation to a physical address. Field 308 is a subopcode field which is used to further define the operation that is associated with the instruction. In one embodiment the subopcode field is used to distinguish decorated load and store instruction types from normal load and store instruction types. For a normal load or store instruction type, register RB may hold an index value to be added to the address value contained in register RA, or may not be used. For store-type instructions, register S (RS) holds data to be stored to a target device. For load-type instructions, register T (RT) indicates the destination register for holding the results of the load operation. Note that for the decorated storage notify (DSN) instruction, the register T (RT) or S(RS) specifier is not included. Since the DSN instruction does not involve a transfer of data, either sourced or received, no register specifier is needed, unlike a normal load or store instruction.

The TLB entry 52 of FIG. 2 has a stored virtual address. If the virtual address provided by the load/store unit 32 matches the stored virtual address 54, the TLB entry 52 is selected by the memory management unit 42. TLB entry 52 provides a virtual-to-physical address translation for the virtual address provided by the load/store unit 32 as well providing page attributes, and access permission values. The TLB entry 52 has an associated physical address and a page size which defines the memory size of the page in memory where the physical address is located. A plurality of permissions is included within the TLB entry 52. The TLB entry also contains a plurality of page attributes. Various attributes can be provided. As an example, the following attributes which form the acronym WIMGE are included:

W write-through cache operation
I caching inhibited operation
M memory coherency required
G guarded (where the access is to a volatile storage device)
E endianness (whether big endian or little endian ordering exists).

It should be understood that these common attributes are provided by way of example only, and other attributes may be included in addition or in lieu of the described attributes. For a normal load or store instruction, if the load/store unit 32 determines that the instruction operation type is not permitted in connection with the permissions obtained form the TLB entry 52 of TLB 50 then an exception is generated by the control circuitry 28 and exception processing is begun by processor 12. For example, if the processor 12 is operating in a user mode, as indicated by the S bit 29 of machine state register 31 having a value of "0", and the instruction is a load operation instruction, then a permission bit from the TLB entry 52 must be set to allow for the read operation performed by the load instruction to occur. Likewise, if the instruction is a store instruction, then another permission bit from the TLB entry 52 must be set to allow for the write operation performed by the store instruction to occur. Similar checks are performed when operating in supervisor mode (S bit 29 equals "1") using permission bits. In the case that the required permissions for a normal load or store instruction are not present, the load or store operation will be aborted by processor 12 and no transmission of the physical address and attributes to the target device specified by the instruction occurs. As can be seen for the case of a normal load or store instruction, all permissions evaluation for the type of access is performed within processor 12 prior to allowing initiation of an access to a target device via the system interconnect 14. In some embodiments however the normal permissions checking operation performed by load/store unit 32 are not performed for decorated load and decorated store instructions. In such embodiments, processor 12 is unaware of the actual operations which will be performed by a device receiving a decoration command via a decoration value, thus, processor 12 has no accurate mechanism to enforce access permissions using the permissions values provided by matching TLB entry 52 when the access address for the decorated load or decorated store instruction is translated. Instead, these access permissions provided by TLB entry 52 during the address translation process are provided to the target device for interpretation, and a subsequent access or operation within the target device is based on the actual permissions types required for the operation specified by the decoration value. In this case, load/store unit 32 of processor 12 does not enforce access permissions for the decorated load or decorated store instruction, but rather, provides the permissions information external to processor 12 for evaluation by the target device, as will be further illustrated in the discussion of FIG. 3. Note that an alternate embodiment may choose to enforce permissions both locally within processor 12, as well as at the target device, in the case that more extensive permissions are actually needed, but cannot be determined solely within the processor 12, since the actual operation to be performed is not completely known by the processor 12.

Illustrated in FIG. 3 is further detail of one form of the direct connection of processor 12 and the intelligent memory 40 via the system interconnect 14, including details of the intelligent memory 40. The intelligent memory 40 has a memory array 70 coupled to a control unit 72 via separate single direction conductors. A decoration decode circuit 76 has a first output coupled to the control unit 72 and a second output coupled to an input of a permissions check circuit 74. The permissions check circuit 74 has an output coupled to an input of the control unit 72. An output of the control unit 72 provides a response back to the processor 12 via the system interconnect 14.

In operation, the processor 12 provides to the intelligent memory 40 various information in response to executing an instruction. A physical address corresponding to a location within memory array 70 is provided. Attributes associated with the physical address are provided. These attributes include, for example, supervisor or user attribute, a read/write (R/W) attribute, a size attribute, a cache inhibited (CI) attribute, a write-through (WT) attribute, a memory coherency required attribute, and other possible attributes, if any. Permissions information, such as a Read permission, a Write permission, or both Read and Write permissions, for example, is also provided to the intelligent memory 40. For store-type instructions, store data is also provided. Additionally, decoration information is also provided to the intelligent memory 40. In the illustrated form the intelligent memory 40 includes control unit 72 which is capable of performing various processing functions on the information that is stored in memory array 70. Which specific predetermined processing function is dependent on the result of the decoration decode circuit 76 which decodes a provided decoration value, and in some embodiments may also be dependent on the particular physical address value and attributes provided to intelligent memory 40. In one embodiment, a decoration attribute provided to the intelligent memory 40 is used to indicate that the memory access request is a decorated load or store operation, rather than a normal load or store operation. In an alternate embodiment, a particular predetermined decoration value may be interpreted to indicate a normal load or store operation is being requested, in which case no special operation is to be performed.

Illustrated in FIG. 4 is one form of a diagram of a Decorated Storage Notify (DSN) data processing instruction 300 in accordance with the present invention. As the term is used herein, a notify instruction is a type of access to a storage device that is neither a load operation nor a store operation. A notify instruction defines an access to a translated address and per se does not contain or transfer data. Thus a notify instruction is an address-only transaction instruction which is executed without a data transfer phase. The decorated storage notify instruction specifies an operation to be performed by the intelligent memory 40 via a decoration value, such as an increment or decrement read-modify-write used to perform statistics updates and is targeted for "decorated storage" which is specialized information storage which is capable of providing local storage read-modify-write operations without involving the processor 12 with the actual read, the execution of a modification instruction and a subsequent store operation. The decorated storage notify data processing instruction 300 also eliminates the need for obtaining a lock variable to perform statistics counter updates.

In the illustrated form of the decorated storage notify data processing instruction 300, an opcode field 302 occupies the most significant bit field. A field 304 holds the contents of a register identified as register A, RA. Decorated storage notify data processing instruction 300 also has a field 306 for holding the contents of a register identified as register B, RB. Decorated storage notify data processing instruction 300 also has a field 308 that is a subopcode field which is an extension of functions associated with the opcode field 302. In other words both fields 302 and 308 are required to distinguish decorated storage notify data processing instruction 300 from other instructions such as a load instruction, a decorated load instruction, a store instruction, a decorated store instruction, a load or store instruction with a decoration indexed, etc. The opcode field 302 identifies a high level function of the instruction. A particular opcode and subopcode value associated with the decorated storage notify data processing instruction 300 notifies an addressed target device such as an "intelligent" memory to perform an operation specified by a decoration value by using only an address transaction or address phase of the communication interconnect. The decoration value may indicate an operation to be performed that is typically more than a load or a store operation and because the target memory is capable of determining the meaning of the decoration value and implementing the associated decoration operation, the memory is referred to as being "intelligent". The execution by processor 12 of the decorated storage notify data processing instruction 300 results in a transaction on the system interconnect 14. No data transfer from the processor 12 is involved in the execution of the decorated storage notify data processing instruction 300. In other words, there is no data returned or driven and thus no data phase on the system interconnect 14 is required. Removing the need for a corresponding data phase improves system performance by significantly lowering the required number of data phases. The instruction field 304 holds a register specifier for a general purpose register RA which contains a decoration value, and the instruction field 306 holds a register specifier for a general purpose register RB which holds an address value which identifies a storage location in the intelligent memory 40. The meaning of the decoration value is device specific and typically only the device that is specified by the address value will have a decoding for the meaning of the decoration value. It should be understood that the illustrated sequence of instruction fields of decorated storage notify data processing instruction 300 is exemplary and the ordering of the instruction fields may be modified. Additional instruction fields that are not illustrated in FIG. 4, such as reserved fields, may also exist.

Figure 5:
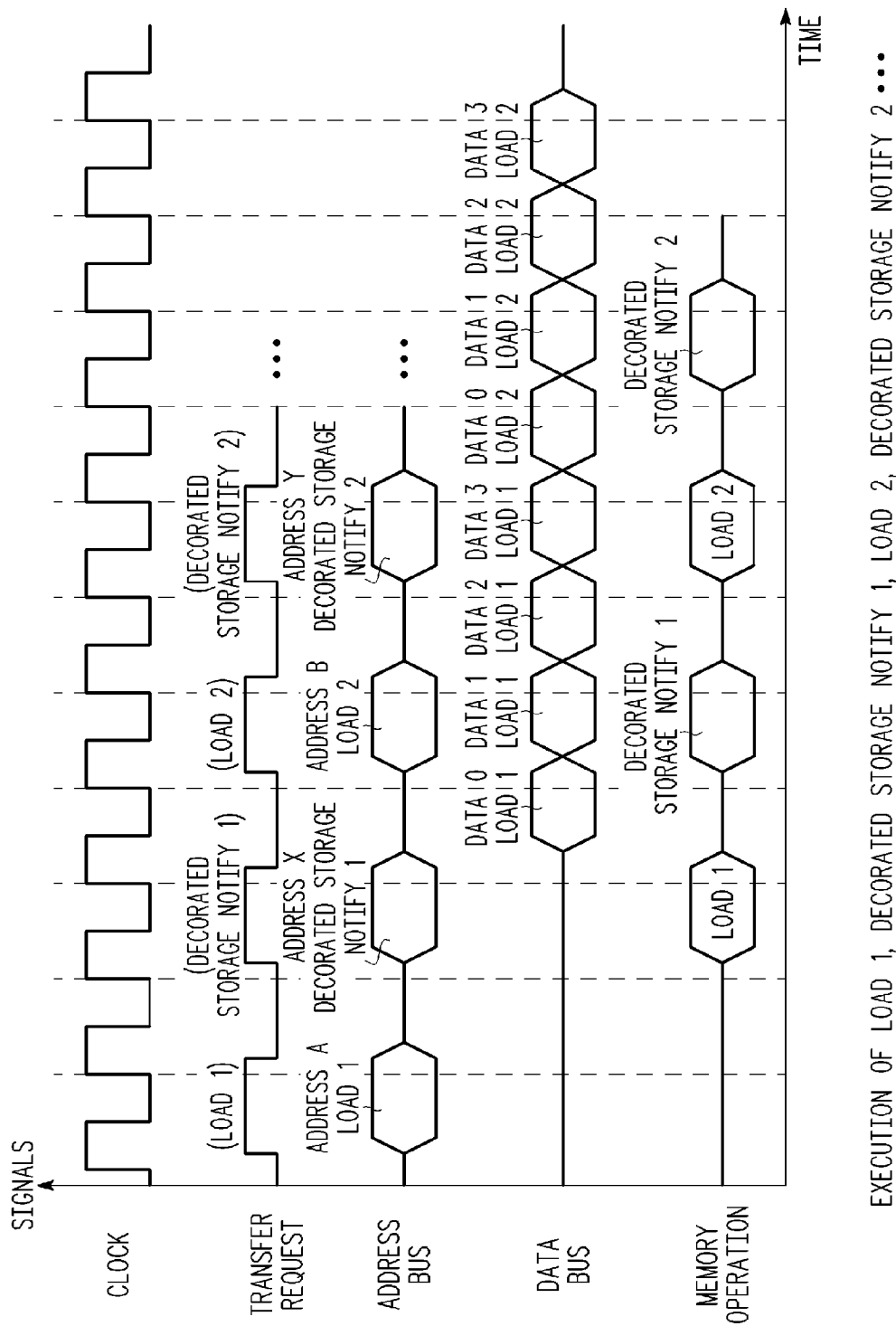
FIG. 5 illustrates in graphical form exemplary signals associated with the execution of load instructions and decorated storage notify instructions in accordance with one embodiment of the present invention.

Illustrated in FIG. 5 is an exemplary timing diagram for better understanding the execution of a decorated storage notify instruction. Sequentially executed in FIG. 5 are a load 1 instruction, a decorated storage notify 1 instruction, a load 2 instruction and a decorated storage notify 2 instruction. A system clock operates at a predetermined frequency. A variety of sequential transfer requests is illustrated wherein a first load instruction, a first decorated storage notify instruction, a second load instruction and a second decorated storage notify instruction are identified. In response to decoding these instructions via the instruction pipeline 22 and control circuitry 28, the transfer request signal in FIG. 5 is selectively asserted by transitioning from a low value to a high value. An address bus is illustrated wherein various transactions on the address bus are illustrated in time. The address bus of FIG. 5 collectively represents the multiple conductor physical address, attributes, permissions and decoration buses illustrated in FIG. 3. During an address phase for a load, store or decorated storage notify instruction, the transfer request is asserted, and the address, attributes, and other associated information is driven out by the processor corresponding to the memory operation being requested. A data bus is illustrated wherein various data transactions associated with the load 1 instruction and the load 2 instruction are illustrated relative to the timing of the memory operation that is performed for the four illustrated instructions. Data is provided on the data bus during a data phase of the bus transaction for a load or store instruction, corresponding to a previous address phase for the instruction, during which the address and other information was driven. It should be understood that the processing environment is a split-transaction bus or interconnect scheme in which transactions consist of a split address phase and data phase and there is overlapping of these phases with other transactions. As illustrated in FIG. 5 the data bus is not used in connection with execution of either of the decorated storage notify instructions. Although the data bus is dedicated strictly to transfer of data associated with the load instructions in the example of FIG. 5, the two decorated storage notify instructions are being executed concurrently with transfer of data on the data bus for the load instructions. FIG. 5 illustrates that bandwidth within data processing system 10 is significantly increased as a result of the ability to implement decorated storage notify instructions (i.e. instructions that cause a command to a memory device to perform a function in addition to a primary function of the executed instruction) to use only an address phase and no data phase. In contrast, each of the load instructions is a transaction on the system interconnect 14 in which both an address phase and a data phase are used and thus have a higher associated bandwidth to process. Because the decorated storage notify instructions do not require a data phase on the system interconnect 14, they can be initiated and completed in a manner that does not lengthen the overall interval of time needed for completion of the system interconnect transfers for the data of load 1 or load 2. Data associated with load 1 and load 2 is provided in a set of burst transfers that each transfer four units (or beats) of data, following the load operation being performed by memory 16 or intelligent memory 40. After the memory operation for load 1 completes at the memory, the data is transferred in a set of four subsequent clock or bus cycles back to processor 12. A subsequent decorated storage notify operation can be performed and completed by memory 40 in response to the address transaction for the decorated storage notify 1 instruction during the data phase interval that the data bus is being used to transfer the four beats of data corresponding to the address phase request for load instruction 1. Similarly, the processing of the memory operation by intelligent memory 40 for the decorated storage notify instruction 2 can be performed during the data phase for the load 2 instruction. Since no data phases are required for decorated storage notify instructions (they are address-only transactions), the interval of time needed to complete the entire sequence of four memory operations (load 1, decorated storage notify 1, load 2, decorated storage notify 2) is minimized, and the operation of a data processing system 10 is improved. If data phases were required for the decorated storage notify instructions, additional time and bandwidth on system interconnect 14 would be required, thus resulting in reduced performance and increased bandwidth needs.

Illustrated in FIG. 6 is an operation table of exemplary decoration values associated with a decorated storage notify transaction when the target device is intelligent memory 40. For example for a decorated storage notify data processing instruction, when the decoration value is 000, the decoration operation is a double word increment operation. The addressed location associated with the decorated load operation is to be incremented in double word format by a default value, such as one. When the decoration value is 001 for a decorated storage notify data processing instruction, the decoration operation is to increment the location specified by the address associated with the decorated load operation by a default value, such as one, in a single word format. When the decoration value is 010 for a decorated storage notify data processing instruction, the decoration operation is to clear the location specified by the address associated with the load operation in a double word format. In order to perform this operation, all zeroes are written to the location. When the decoration value is 111 for a decorated storage notify data processing instruction, the decoration operation is to clear the location specified by the address associated with the load operation in a single word format. For these operations, it is assumed that the required permissions have already been checked by processor 12 prior to initiation of the access to the target device. It should be understood that the encodings provided in the operation table of FIG. 6 are provided by way of example only. Any number of bit sizes may be implemented as the decoration value and other types of instruction operation and decoration operations may be readily used. Decoration decode circuit 76 and permissions check circuit 74 of intelligent memory 40 serve to perform remote permissions checking of the received decorated load or decorated store operation. For each decoration value, the required permissions for operation is determined by the decoration decode circuit 76 and are provided to the permissions check circuit 74. The permissions check circuit 74 compares the permissions values from the system interconnect 14 that are received with the access request with the required permissions for the decoration operation as determined by decoration decode circuit 76. The permissions check circuit 74 determines whether sufficient permissions are present to allow the decorated load or store operation to occur. If sufficient permissions are not present, the permissions check circuit 74 informs the control unit 72 of intelligent memory 40 that the operation should not occur. In response, the control unit 72 provides a response back to the processor 12 via response signals transmitted on the system interconnect 14 indicating that an exception condition has occurred, and no operation is performed to memory array 70. If the results of the checking performed by the permissions check circuit 74 indicate that the required permissions for the operation performed by the received instruction operation and decoration value are satisfactory, it indicates such to control unit 72, which may then proceed with the indicated operation(s) and provide a normal response back to processor 12 upon successful completion of the required operation.

Figure 7:
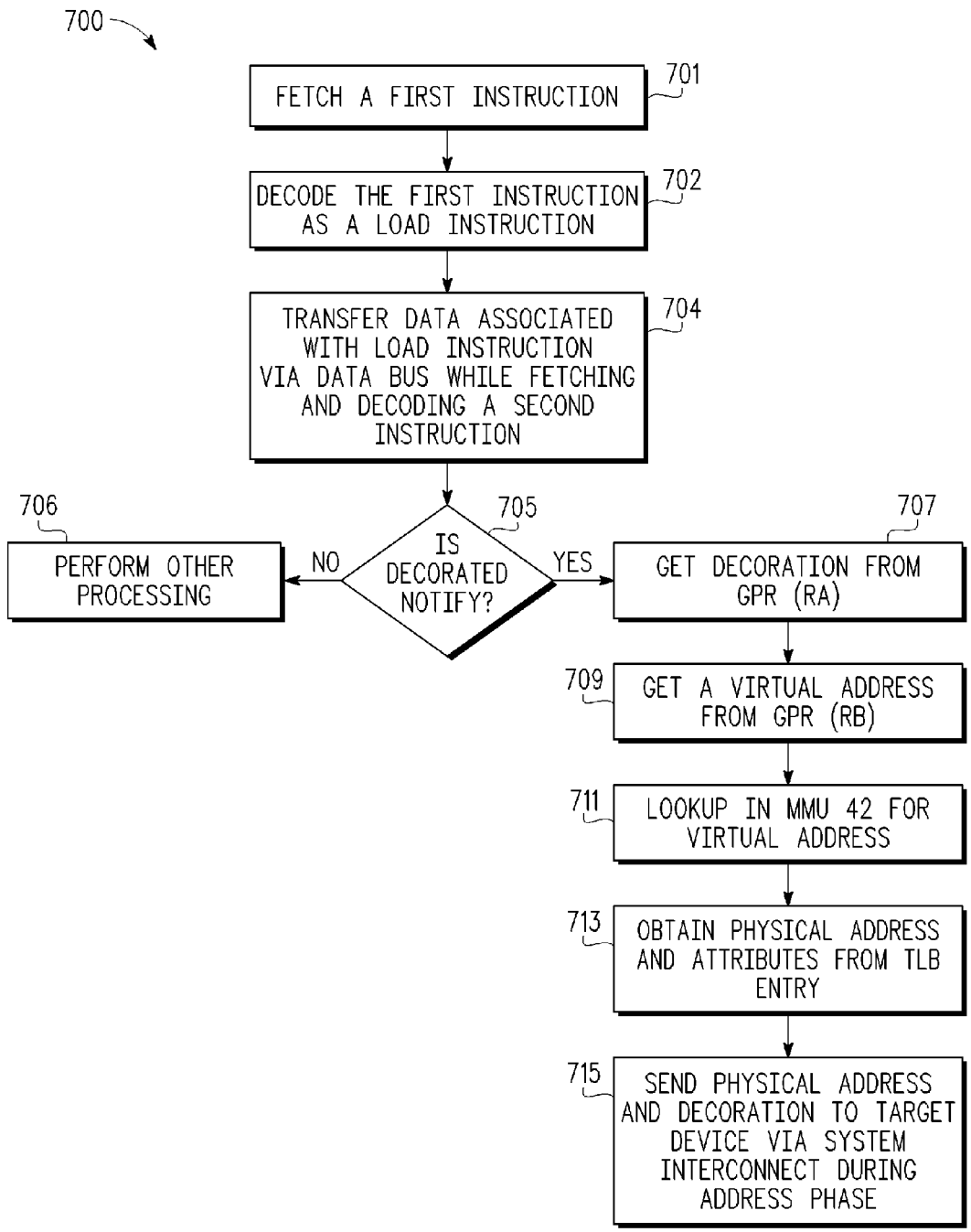
FIG. 7 illustrates, in flow chart form, an exemplary method of processing an instruction having permissions information in accordance with the present invention.

Illustrated in FIG. 7 is a method 700 illustrating one form of how two successive instructions, a load instruction and a decorated notify instruction, are executed. In a step 701 a first data processing instruction is fetched such as by the instruction fetch unit 26 via the bus interface unit (BIU) 34 of FIG. 2. In a step 702 the first instruction is decoded as a load instruction. In one form the decoding occurs in the instruction pipeline 22 of FIG. 2. In a step 704, data that is associated with the load instruction is transferred via the Data bus portion of system interconnect 14 while fetching and decoding a second data processing instruction. In a step 705 a determination is made whether the second fetched and decoded instruction is a decorated storage notify instruction. If the decoded instruction is not a decorated storage notify instruction then other processing of the instruction than described herein is performed in a step 706. If the decoded instruction is a decorated storage notify instruction, in a step 707 the load/store unit 32 gets a decoration (i.e. a decoration command) from one (register A, RA) of the general purpose registers (GPR) 30. In a step 709 the load/store unit 32 obtains a virtual address defined by the instruction from one (register B, RB) of the general purpose registers (GPR) 30. In a step 711, the load/store unit 32 under control of the control circuitry 28 functions to find or lookup in the translation lookaside buffer (TLB) 50 of memory management unit (MMU) 42 the virtual address which was designated by register B. A match of stored virtual addresses in the MMU 42 with the virtual address from register B is identified. The matching virtual address is stored in a predetermined TLB entry of the TLB 50 such as TLB entry 52 of FIG. 2. In a step 713 a correlated physical address and page attributes are obtained from the TLB entry 52 and sent to the load/store unit 32. In a step 715 the physical address and decoration are sent to a designated target device via the bus interface unit 34 and the system interconnect or system interconnect 14 during the address phase of the transaction for subsequent processing, the processing to be performed by the intelligent memory 40 based on the decoration value and the address provided during an address-only transaction.

By now it should be appreciated that there has been provided a data processing system that uses a decorated storage notify data processing instruction for efficiently controlling atomic operations, such as storage-local read-modify-write operations, or other types of acceleration. The decorate storage notify data processing instruction does not involve the processor 12 with the actual read and modification instructions and the subsequent store operation. The use of lock variables has been eliminated for implementing a function such as a statistic counter update. A single instruction, the DSN instruction, uses an address-only bus transaction to perform a ready-modify-write operation of a storage location. A standard or conventional bus protocol may be used in connection with the DSN instruction.

Because the apparatus implementing the present invention is, for the most part, composed of electronic components and circuits known to those skilled in the art, circuit details has not been explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary data processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. It should be understood that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. Any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of data processing system 10 are circuitry located on a single integrated circuit or within a same device. Alternatively, data processing system 10 may include any number of separate integrated circuits or separate devices interconnected with each other. For example, intelligent memory 40 may be located on a same integrated circuit as processor 12 or on a separate integrated circuit or located within another peripheral or slave discretely separate from other elements of data processing system 10. Peripherals 18 and 20 may also be located on separate integrated circuits or devices. Also for example, data processing system 10 or portions thereof may be readily transformed into software as a representation of physical circuitry or of logical representations convertible into physical circuitry. As such, data processing system 10 may be embodied in a hardware description language of any appropriate type.

In one form there is herein provided a method of operating a data processing system including a processor, a system interconnect, and a memory device. The processor and the memory device are operably coupled to the system interconnect. A memory device performs a first memory operation in response to a first transaction on the system interconnect from the processor, the first transaction including an address phase and a data phase. The memory device performs a second memory operation in response to a second transaction on the system interconnect from the processor, wherein the second transaction includes an address phase and no data phase. Performing the second memory operation by the memory device includes performing a read-modify-write operation of a storage location of the memory device. In one form the address phase of the second transaction includes an address of the storage location. In another form the first memory operation is characterized as a store operation to the storage location, wherein the data stored in the store operation is included in the data phase, wherein the address of the storage location is included in the address phase of the first transaction. In another form the system interconnect includes a data bus and an address bus, wherein the data phase includes data being provided on the data bus, wherein no data is provided on the data bus for the second transaction. In yet another form performing the read-modify-write operation includes incrementing a value stored at the storage location. In another form performing the read-modify-write operation includes decrementing a value stored at the storage location. In another form the address phase of the second transaction includes a decoration value, wherein the performing the second memory operation includes performing a decoration operation specified by the decoration value.

In yet another form there is herein provided a processor having an execution unit and an interface unit that is coupled to a system interconnect. The processor is configured to initiate a first type of interconnect transaction to a target device via the system interconnect. The first type of interconnect transaction includes an address phase and a data phase. A second type of interconnect transaction to a target device is initiated via the system interconnect. The second type of interconnect transaction includes an address phase and no data phase. The second type of interconnect transaction includes an indication of a device operation to be performed by the target device. The device operation includes a read-modify-write operation of a storage location of the target device. In another form the address phase of the second type of interconnect transaction includes an address of the storage location. In another form the first type of interconnect transaction includes an indication of a store operation to the storage location. The data phase includes data stored in the storage operation and the address phase of the first type of interconnect transaction includes an address of the storage location. In another form the read-modify-write operation includes incrementing a value stored at the storage location. In yet another form the data processing system further includes the system interconnect and the target device. In yet another form the target device includes a controller, wherein the controller decodes the indication and performs the device operation. In another form the target device is a memory.

In another form there is herein provided a method of operating a data processing system. A target device receives a first type of transaction initiated by a processor. The first type of transaction includes address information carried by address signals over a system interconnect and data information carried by a data signals over the system interconnect. The first type of transaction includes an indication of a device operation. The device operation is performed by the target device in response to the first type of transaction. The target device receives a second type of transaction initiated by the processor. The second type of transaction includes address information carried by address signals over the system interconnect and no data information carried over the system interconnect. The second type of transaction includes an indication of a read-modify-write operation. The read-modify-write operation of a storage location of the target device is performed in response to the second type of transaction. In one form the address information of the second type of transaction includes an address of the storage location. In another form the device operation is characterized as a store operation to the storage location. The data information of the first type of transaction includes the data stored in the store operation and the address information of the first type of transaction includes the address of the storage location. In another form the target device is a memory. In another form the read-modify-write operation includes incrementing a value stored at the storage location. In yet another form the read-modify-write operation includes decrementing a value stored at the storage location.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, data processing system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an"

limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Although the invention is described herein with reference to specific embodiments, various modifications and changes can be made without departing from the scope of the present invention as set forth in the claims below. For example, the number of bits used in the address, attributes, permissions and decorations fields may be modified based upon system requirements. The permissions that are associated with a particular operation may vary or be modified. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

What is claimed is:

1. A method of operating a data processing system including a processor, a split-transaction system interconnect that utilizes a split-transaction protocol for transferring operands, and a memory device, wherein the processor and the memory device are operably coupled to the split-transaction system interconnect, the method comprising:
    performing by a memory device, a first memory operation in response to a first split-transaction on the split-transaction system interconnect from the processor, the first split-transaction including an address phase using an address bus and a data phase using a data bus of the split-transaction system;
    performing by the memory device a second memory operation in response to an address-only transaction on the split-transaction system interconnect from the processor, wherein the address-only transaction on the split-transaction system interconnect has a decoration value indicated by a notify instruction comprising a read-modify-write operation and the memory device detects the decoration value and performs the read-modify-write operation using an address phase using the address bus and no subsequent data phase on the split-transaction system interconnect and thereby does not use the data bus; and
    performing by the memory device a third memory operation in response to a second split-transaction on the split-transaction system interconnect from the processor which uses the data bus and the address bus;
    wherein the performing the second memory operation by the memory device includes performing the read-modify-write operation of a storage location of the memory device for the address-only transaction so that the third memory operation can use the data bus during a time the second memory operation would have used the data bus if the second memory operation had been a split-transaction with an address phase and a data phase.

2. The method of claim 1 wherein the address phase of the address-only transaction includes an address of the storage location.

3. The method of claim 2 wherein:
    the first memory operation is characterized as a store operation to the storage location, wherein the data stored in the store operation is included in the data phase of the first split-transaction, and wherein the address of the storage location is included in the address phase of the first split-transaction.

4. The method of claim 1 wherein the performing the read-modify-write operation includes incrementing a value stored at the storage location.

5. The method of claim 1 wherein the performing the read-modify-write operation includes decrementing a value stored at the storage location.

6. A processor comprising:
    an execution unit; and
    an interface unit for coupling to a split-transaction system interconnect that utilizes a split-transaction protocol for transferring of operands using an address bus and a data bus;
    wherein the processor is configured to:
        initiate first and second transactions of a first type of interconnect transaction that is a split-transaction to a target device via the split-transaction system interconnect, the first type of interconnect transaction including an address phase using the address bus and a data phase using the data bus; and
        initiate an address-only transaction between the first and second transactions to a target device via the split-transaction system interconnect, the address-only transaction including an address phase using the address bus and no data phase thereby not using the data bus, the address-only transaction providing a decoration value indicated by a notify instruction comprising a read-modify-write operation to be performed by the target device that does not use the data bus so that the second transaction can use the data bus during a time the address-only transaction would have used the data bus if the address-only transaction had been the first type of interconnect transaction with an address phase and a data phase.

7. The processor of claim 6 wherein:
    the address phase of the address-only transaction includes an address of the storage location.

8. The processor of claim 7 wherein:
    the first type of interconnect transaction includes an indication of a store operation to the storage location, wherein the data phase includes data stored in the store operation, and wherein the address phase of the first type of interconnect transaction includes an address of the storage location.

9. The processor of claim 6 wherein the read-modify-write operation includes incrementing a value stored at the storage location.

10. A data processing system including the processor of claim 6, further comprising:
    the split-transaction system interconnect; and
    the target device.

11. The data processing system of claim 10, wherein the target device includes a controller, wherein the controller decodes the decoration and performs the read-modify-write operation.

12. The data processing system of claim 10 wherein the target device is a memory.

13. A method of operating a data processing system including a split-transaction system interconnect that utilizes a split-transaction protocol for transferring operands, the method comprising:
    receiving by a target device a first transaction of a first type of split-transaction initiated by a processor, the first type of split-transaction including address information carried by address signals over an address bus of the split-transaction system interconnect and data information carried by a data signals over a data bus of the split-transaction system interconnect, the first type of split-transaction including an indication of a device operation;

performing the device operation by the target device in response to the first type of split-transaction;

receiving by the target device over the split-transaction system interconnect an address-only transaction initiated by the processor, the address-only transaction including address information carried by address signals over the address bus of the split-transaction system interconnect and no data information carried over the data bus of the split-transaction system interconnect, the address-only transaction including a decoration value indicated by a notify instruction comprising a read-modify-write operation and the target device detects the decoration value and performs the read-modify-write operation using an address phase using the address bus and no subsequent data phase on the split-transaction system interconnect and thereby does not use the data bus;

performing the read-modify-write operation of a storage location of the target device in response to the address-only transaction in response to only the address phase of the address-only transaction without a subsequent data phase occurring on the split-transaction system interconnect; and receiving by the target device a second transaction of the first type of split-transaction initiated by the processor using the address bus and the data bus, wherein the using the data bus is during a time the address-only transaction would have used the data bus if the address-only transaction had been the first type of split-transaction.

14. The method of claim 13 wherein the address information of the address-only transaction includes an address of the storage location.

15. The method of claim 14 wherein:
the device operation is characterized as a store operation to the storage location, wherein the data information of the first type of split-transaction includes the data stored in the store operation, wherein the address information of the first type of transaction includes the address of the storage location.

16. The method of claim 13 wherein the target device is an intelligent memory.

17. The method of claim 13 wherein the performing the read-modify-write operation includes incrementing a value stored at the storage location.

18. The method of claim 13 wherein the performing the read-modify-write operation includes decrementing a value stored at the storage location.

19. A method of operating a data processing system including a processor, a split-transaction system interconnect that utilizes a split-transaction protocol for transferring operands, and an intelligent memory, wherein the processor and the intelligent memory are operably coupled to the split-transaction system interconnect, the method comprising:

performing by the intelligent memory, a first memory operation in response to a first split-transaction on the split-transaction system interconnect from the processor, wherein the first split-transaction includes an address phase using an address bus and a data phase using a data bus; and performing by the intelligent memory, a second memory operation in response to an address-only transaction on the split-transaction system interconnect from the processor, wherein the address-only transaction includes an address phase using the address bus and no subsequent data phase for the address-only transaction on the split-transaction system interconnect thereby not using the address bus;

wherein the performing the second memory operation by the intelligent memory includes performing a read-modify-write operation of a storage location of the intelligent memory in response to only the address phase of the address-only transaction without a subsequent data phase occurring on the split-transaction system interconnect for the second transaction;

wherein the address phase of the address-only transaction includes a decoration value, and performing the second memory operation includes performing a decoration operation specified by the decoration value;

performing by the intelligent memory, a third memory operation in response to a third split-transaction received, immediately after the address-only transaction was received, on the split-transaction system interconnect from the processor, wherein the third split-transaction includes an address phase using the address bus and a data phase using the data bus, wherein the using the data bus occurs during a time the second memory operation would have used the data bus if the second memory operation had been a split-transaction with an address phase and a data phase.

20. The method of claim 19, wherein the decoration value comprises a command to the intelligent memory to perform a function in addition to a primary function of the first split-transaction.

21. The method of claim 20, wherein the decoration value is interpreted by the intelligent memory and not by the processor.

22. The method of claim 19, wherein the intelligent memory performs an atomic operation in response to the decoration value.

* * * * *